(12) United States Patent
Park et al.

(10) Patent No.: US 9,609,304 B2
(45) Date of Patent: Mar. 28, 2017

(54) 3-DIMENSIONAL DATA PROCESSING APPARATUS AND METHOD

(71) Applicant: Electronics and Telecommunications Research Institute, Daejeon (KR)

(72) Inventors: Il Kyu Park, Daejeon (KR); Do Hyung Kim, Chungcheongbuk-do (KR); Seong Jin Park, Daejeon (KR); Jin Sung Choi, Daejeon (KR); Bon Ki Koo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 295 days.

(21) Appl. No.: 14/309,820

(22) Filed: Jun. 19, 2014

(65) Prior Publication Data

US 2015/0208056 A1     Jul. 23, 2015

(30) Foreign Application Priority Data

Jan. 20, 2014  (KR) .......... 10-2014-0006675

(51) Int. Cl.
*H04N 13/00*          (2006.01)

(52) U.S. Cl.
CPC ..... *H04N 13/0029* (2013.01); *H04N 13/0007* (2013.01)

(58) Field of Classification Search
CPC .............. H04N 13/0007; H04N 13/0029

USPC .......................................... 348/43
See application file for complete search history.

(56) References Cited

U.S. PATENT DOCUMENTS

| | | | |
|---|---|---|---|
| 8,514,219 B2 | 8/2013 | Saito | |
| 2011/0304691 A1 | 12/2011 | Newton et al. | |
| 2013/0162768 A1* | 6/2013 | Lie | H04N 13/0264 348/43 |
| 2013/0242043 A1 | 9/2013 | Yang et al. | |
| 2013/0336640 A1* | 12/2013 | Nevarez | G11B 27/034 386/280 |
| 2014/0092221 A1* | 4/2014 | Nagai | H04N 13/0022 348/51 |
| 2015/0116457 A1* | 4/2015 | Barkatullah | H04N 13/026 348/43 |
| 2015/0237323 A1* | 8/2015 | Du | H04N 13/0011 348/43 |

\* cited by examiner

*Primary Examiner* — Behrooz Senfi

(57) ABSTRACT

Provided are three-dimensional (3D) data processing apparatus and method. 3D stereoscopic image common format data preserving common 3D image information is defined by converting 3D stereoscopic image data of each format to apply the same 3D image processing algorithm to 3D data of various formats, and native format data of each format is maintained to maintain merits of each format, and a format-specific algorithm table is maintained with respect to a common 3D image processing function, whereby the same 3D image processing algorithm may be applied to various 3D data and a unique algorithm allowing for maintaining the merits of each 3D data may be applied.

16 Claims, 3 Drawing Sheets

3-DIMENSIONAL DATA PROCESSING APPARATUS AND METHOD

CROSS-REFERENCE TO RELATED APPLICATIONS

This application claims priority under 35 U.S.C. §119 to Korean Patent Application No. 10-2014-0006675, filed on Jan. 20, 2014, the disclosure of which is incorporated herein by reference in its entirety.

TECHNICAL FIELD

The present invention relates to an apparatus and method for processing three-dimensional (3D) data obtained through various sensors, and more particularly, to a 3D data processing apparatus and method for applying a 3D stereoscopic image processing algorithm to various types of 3D stereoscopic image data.

BACKGROUND

With the advancement of sensors for recording data having 3D information such as laser scanning, a stereoscopic camera, a structured light scanner, the Microsoft Kinect™, a light field camera, and the like, various types of 3D stereoscopic image data may be obtained. The respective sensors generate 3D data in different formats, and such data in different formats have the merits and demerits, which, thus, are stored in different manners and different algorithms are applied thereto to be processed according to purposes.

A framework of software for 3D stereoscopic image processing performs 3D stereoscopic image processing using various types of data formats. Since data formats are different, when the same stereoscopic image processing algorithm is applied, data formats are converted into intermediate data in a common format and the stereoscopic image processing algorithm is applied thereto. Thus, obtained 3D stereoscopic image data is converted into intermediate formats and the 3D image processing algorithm is subsequently applied to the converted intermediate format, not to the original obtained format.

However, there may be a native algorithm that may be used only in a data format, not a common algorithm, according to types of 3D image processing scheme and types of data. In this case, the native algorithm applied only to the corresponding format should be used to obtain better results in terms of speed and quality.

Also, data storing 3D information since it was obtained or generated (for example, a laser-scanned point cloud, 3D mesh generated through modeling by a user, and the like) has a significant difference in data characteristics from 3D image data based on a 2D image, so conversion of such data into a common format and application of a common algorithm thereto causes huge data loss.

SUMMARY

Accordingly, the present invention provides a three-dimensional (3D) data processing apparatus and method capable of applying the same 3D image processing algorithm to a 3D stereoscopic image data obtained by using various types of sensors and 3D stereoscopic image data generated by a designer regardless of data formats, and capable of applying a unique 3D image processing algorithm according to formats to utilize the merits of respective formats.

In one general aspect, a three-dimensional (3D) data processing apparatus includes: a 3D data obtaining unit configured to obtain 3D data; an integrated format data generating unit configured to integrate native format data of the 3D data and common format data generated by using the 3D data to generate integrated format data; and an integrated format data processing unit configured to process the integrated format data according to an image processing algorithm.

The integrated format data processing unit may check whether a native algorithm with respect to the native format data of the integrated format data exists, and when a native algorithm exists, the integrated format data processing unit may process the native format data of the integrated format data according to the native algorithm, and when a native algorithm does not exist, the integrated format data processing unit may process the common format data of the integrated format data according to a common algorithm.

When a native algorithm and a common algorithm for processing the integrated format data do not exist, the integrated format data processing unit may return an error.

The integrated format data processing unit may generate the common format data by using 2D image information and 2D depth information of the 3D data, and when the 3D data does not include depth information, the integrated format data processing unit may restore depth information of the 3D data through a depth restoration algorithm, and generate common format data.

In another general aspect, a three-dimensional (3D) data processing method includes: obtaining 3D data; generating common format data by using the 3D data; integrating native format data of the 3D data and the common format data to generate integrated format data; processing the integrated format data according to an image processing algorithm; and processing the integrated format data according to the image processing algorithm to output a generated stereoscopic image.

Other features and aspects will be apparent from the following detailed description, the drawings, and the claims.

DETAILED DESCRIPTION OF EMBODIMENTS

Hereinafter, embodiments of the present invention will be described in detail with reference to the accompanying drawings.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Hereinafter, embodiments of the present invention will be described in detail with reference to the accompanying drawings.

Terms used in the present invention are defined as follows.

3D stereoscopic image data: Data that has both 2D color or gray image information such as a stereo, light field, range scan data, and the like, and 3D information or that may be extracted or converted through a unique algorithm 3D data: Data that includes 3D stereoscopic image data and that includes 3D information such as 3D mesh, point cloud, or the like, not stereoscopic image data, and that may be converted into an image 3D stereoscopic image common format: Format of data converting 3D data to store 2D image information and 2D depth information required in a common algorithm 3D stereoscopic image native format: Format of data as the sum of original data such as stereo, light field, range scan, and the like, a state before 3D data is converted into a stereoscopic image and additional data such as depth data, or the like, obtained by processing the original data so as to be easily used.

Figure 1:
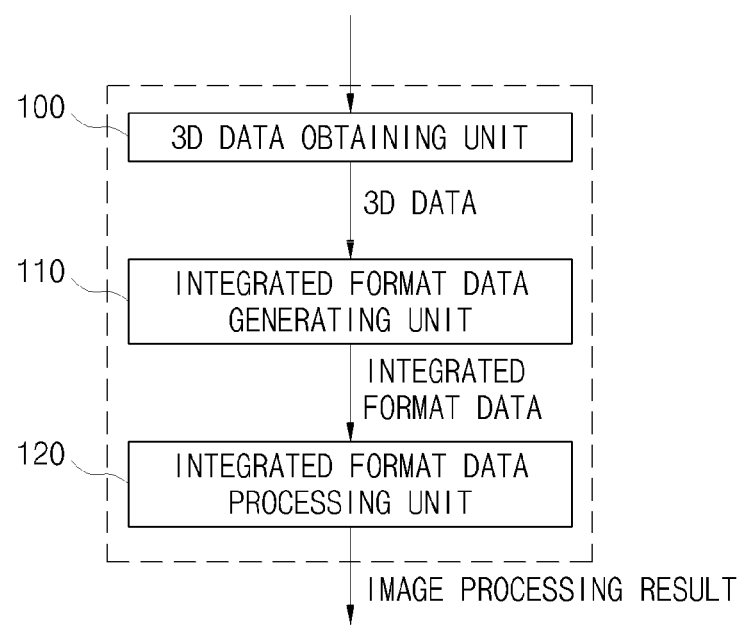
FIG. 1 is a block diagram illustrating a structure of a three-dimensional (3D) data processing apparatus according to an embodiment of the present invention.

3D stereoscopic image integrated format: Format of data obtained by adding a 3D stereoscopic image native format to 3D stereoscopic image common format data 3D image processing function, algorithm: Function or algorithm providing 3D conversion, or the like, such as a 3D special effect such as a fog impact, or the like, or view conversion by using a depth value in addition to a color value of a color or gray image 3D depth restoration algorithm: Algorithm of estimating or calculating a depth of each pixel from 3D stereoscopic image data not having a depth value of each pixel FIG. 1 is a block diagram illustrating a structure of a 3D data processing apparatus according to an embodiment of the present invention.

The 3D data processing apparatus according to the present invention includes a 3D data obtaining unit 100, an integrated format data generating unit 110, and an integrated format data processing unit 120.

The 3D data obtaining unit 100 obtains 3D data through a sensor or obtains 3D data generated by software.

The 3D data obtaining unit 100 may obtain a 3D stereoscopic image of an actual subject through a sensor according to types of 3D data, and in case of a subject that does not actually exists or a subject difficult to obtain by a sensor, data virtually created by using software such as a 3D modeling tool by a designer may be obtained as 3D data.

A sensor refers to any type of device capable of obtaining a stereoscopic image such as a stereoscopic camera, a light field camera, a laser scanner, and the like, and 3D data includes 3D stereoscopic image data and data that includes 3D information such as a 3D mesh, a point cloud, or the like, and that may be converted into an image, besides 3D stereoscopic image data.

The 3D data obtaining unit 100 designates original data of obtained 3D data, as native format data or designates data obtained by adding depth information to obtained 3D data, as native format data.

Native formats of data output from sensors are determined by types of sensor to be used. In case of a stereoscopic camera, left and right color images and a depth image calculated by using the left and right color images are a format, and in case of a light field camera, 4D light field data and a calculated depth value are a native format. In case of using a laser scanner, point cloud data or a 2D color image and a depth image are a native format.

Unique 3D algorithms are provided by native formats of respective 3D data, so types of algorithms provided for each format are defined. In case of a stereoscopic image, a left/right view conversion function is provided, and in case of a light field image, an upper/lower left/right view conversion function is provided.

In a case in which obtained 3D data is data other than 3D stereoscopic image data, the 3D data obtaining unit 100 may generate image information and depth information by applying rendering.

The 3D data obtaining unit 100 delivers information regarding the obtained 3D data and native format data of the 3D data to the integrated format data generating unit 110, and in this case, the 3D data obtaining unit 100 may deliver image information and depth information generated from the 3D data together.

The integrated format data generating unit 110 generates integrated format data by integrating common format data generated by using the native format data of the 3D data and the 3D data delivered from the 3D data obtaining unit 100.

In detail, the integrated format data generating unit 110 generates common format data by using 2D image information and 2D depth information of the 3D data. In a case that the 3D data includes 2D image information and 2D depth information, the integrated format data generating unit 110 may generate common format data by using the information included in the 3D data, or otherwise, the integrated format data generating unit 110 may generate 2D image information or 2D depth information from the 3D data and generate common format data.

Meanwhile, in a case that the 3D data does not include depth information, the integrated format data generating unit 110 may restore depth information of the 3D data through a depth restoration algorithm and generate common format data by using the restored depth information.

The obtained 3D data may include depth data (for example, a laser scanner, or the like) or may not (for example, stereoscopic data, or the like) according to types of data. Since the common format data requires depth data, if data does not have depth data, the integrated format data generating unit 110 calculates depth data by applying a 3D depth restoration algorithm to the data without depth data. When the depth data is restored, the integrated format data generating unit 110 integrates the restored depth data and the 2D image information to generate data of a 3D stereoscopic image common format, and combines the generated data with 3D stereoscopic image native format data to generate 3D stereoscopic image integrated data.

After generating the integrated format data by integrating the native format data of the 3D data and the common format data, the integrated format data generating unit 110 delivers the generated integrated format data to the integrated format data processing unit 120.

The integrated format data processing unit 120 processes the integrated format data delivered from the integrated format data generating unit 110 according to an image processing algorithm, and outputs the processed stereoscopic image.

In detail, in processing the integrated format data, the integrated format data processing unit 120 checks whether a unique native algorithm with respect to the native format data of the integrated format data exists. When a unique native algorithm exists, the integrated format data processing unit 120 processes the native format data by applying the native algorithm, rather than using the common format data of the integrated format data to be processed.

If a native algorithm with respect to the native format data of the integrated format data does not exist, the integrated format data processing unit 120 processes the common format data of the integrated format data by applying a common algorithm and outputs a processed stereoscopic image.

Meanwhile, both a native algorithm and a common algorithm with respect to the 3D stereoscopic image processing function to be applied do not exist, the integrated format data processing unit 120 returns an error.

In case of applying a focus changing function as an example of 3D stereoscopic image processing to a stereo-based 3D stereoscopic image data and light field-based 3D stereoscopic image data, when focus changing is applied to stereoscopic data, since a native algorithm does not exist, a focus changing common algorithm is applied to common format data to create a result. In case of performing focus changing on light field-based data, a light field-dedicated native focus changing algorithm, without using the common algorithm, is applied to create a result.

By applying native algorithms by respective formats, better results in terms of speed and quality may be obtained, compared to a case of performing a common algorithm on common format data causing data loss by processing native data once.

Figure 2:
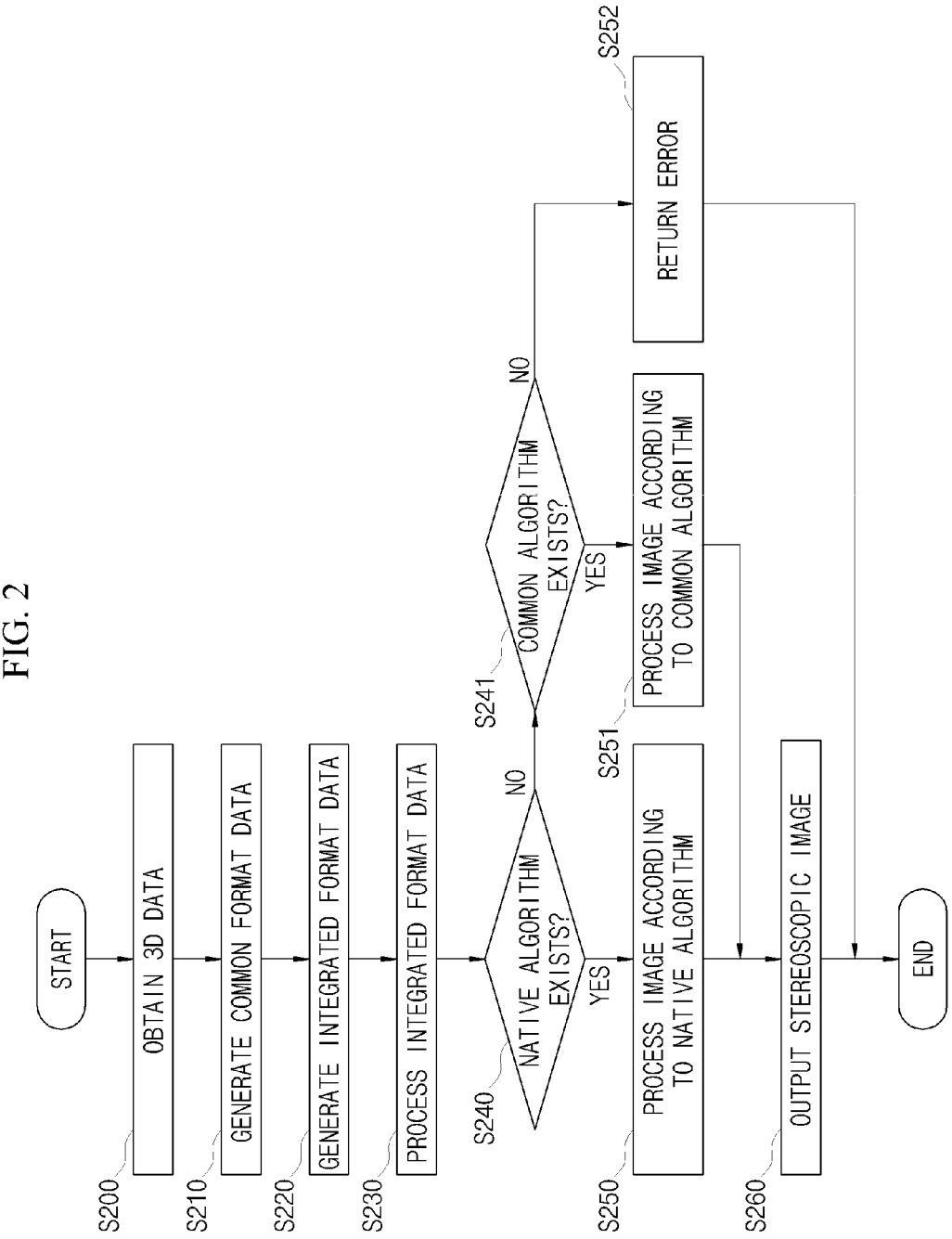
FIG. 2 is a flow chart illustrating a process of a 3D data processing method according to an embodiment of the present invention.

FIG. 2 is a flow chart illustrating a process of a 3D data processing method according to an embodiment of the present invention.

The 3D data processing apparatus according to the embodiment of the present invention obtains 3D data obtained through a sensor or generated by software in operation S200. When the 3D data is obtained, common format data including 2D image information and 2D depth information of the 3D data is generated in operation S210, and native format data and common format data of the 3D data are integrated to generate integrated format data in operation S220.

When processing the integrated format data in operation S230, the 3D data processing apparatus checks whether a unique native algorithm with respect to the native format data of the integrated format data exists in operation S240.

When a native algorithm exists, the 3D data processing apparatus applies the native algorithm to the native format data of the integrated format data to process the same in operation S250, and outputs a processed stereoscopic image in operation S260.

When a native algorithm does not exist, the 3D data processing apparatus checks whether a common algorithm supporting an image processing function to be applied exists in operation S241, and applies the common algorithm to the common format data of the integrated format data to process the data in operation S251.

If both the native algorithm and the common algorithm with respect to the image processing function to be applied do not exist, the 3D data processing apparatus returns an error in operation S252.

In the embodiments of the present invention, 3D stereoscopic image data obtained through various types of sensors may be processed by applying the same algorithm and if each data format has different merits, a native algorithm for each format may be applied to utilize the merits thereof within a single framework.

Also, in the case of applying a common algorithm, since conversion into a common format has already been performed in advance, a process time taken for data conversion may be saved in processing a stereoscopic image.

Figure 3:
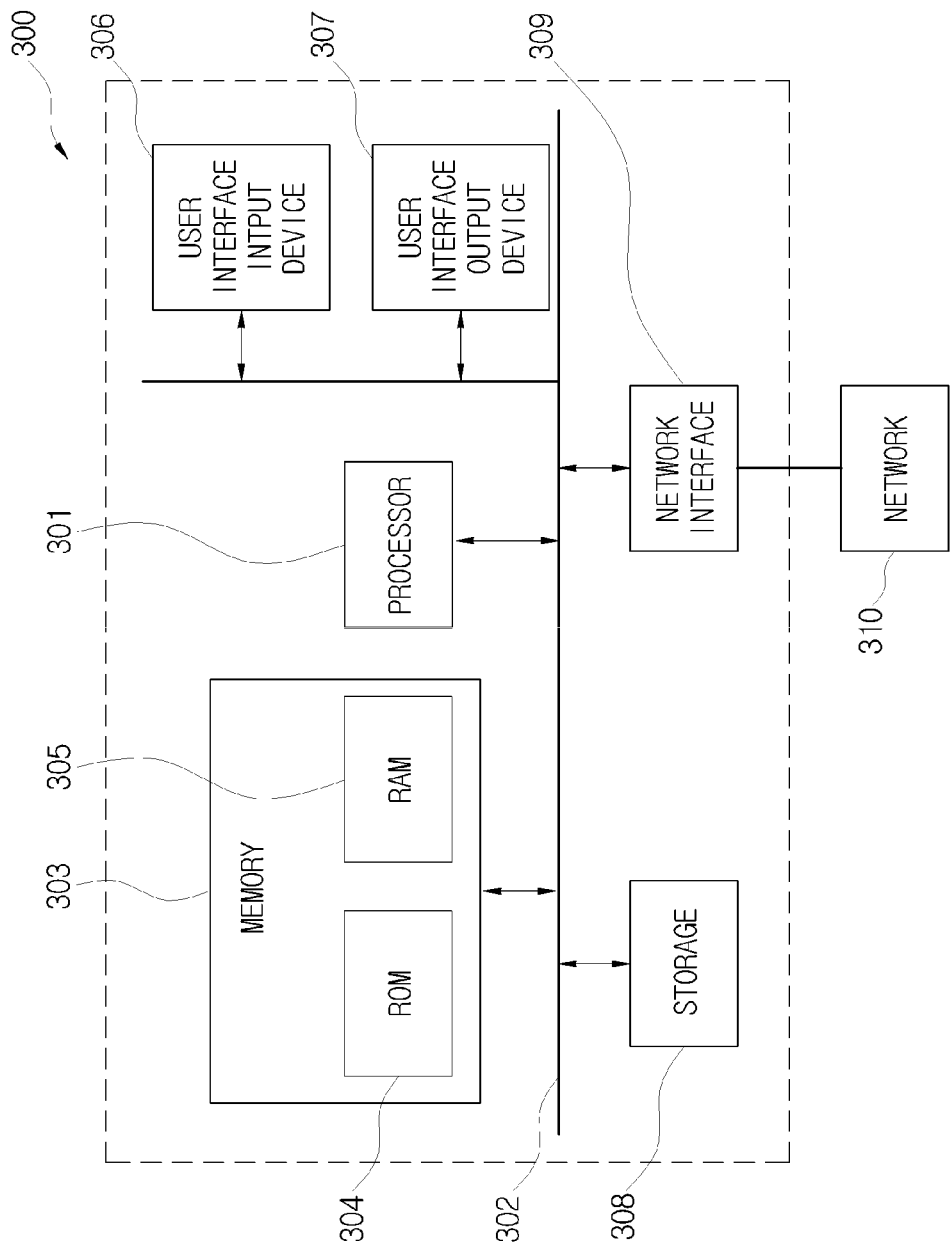
FIG. 3 is a block diagram showing a computer system implemented according to an embodiment of the present invention.

An embodiment of the present invention may be implemented in a computer system, e.g., as a computer readable medium. As shown in FIG. 3, a computer system 300 may include one or more of a processor 301, a memory 303, a user input device 306, a user output device 307, and a storage 308, each of which communicates through a bus 302. The computer system 300 may also include a network interface 309 that is coupled to a network 310. The processor 301 may be a central processing unit (CPU) or a semiconductor device that executes processing instructions stored in the memory 303 and/or the storage 308. The memory 303 and the storage 308 may include various forms of volatile or non-volatile storage media. For example, the memory 303 may include a read-only memory (ROM) 304 and a random access memory (RAM) 305.

Accordingly, an embodiment of the invention may be implemented as a computer implemented method or as a non-transitory computer readable medium with computer executable instructions stored thereon. In an embodiment, when executed by the processor, the computer readable instructions may perform a method according to at least one aspect of the invention.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A three-dimensional (3D) image data processing apparatus comprising:
    a 3D image data obtaining unit to obtain, using a processor, 3D image data;
    an integrated format data generating unit to integrate, using a processor, native format data of the 3D image data and common format data generated by using the 3D image data to generate integrated format data; and
    an integrated format data processing unit to process, using a processor, the integrated format data according to an image processing algorithm,
    wherein the integrated format data processing unit determines whether a native image processing algorithm with respect to the native format data of the integrated format data is present or absent,
    wherein when the native image processing algorithm is present, the integrated format data processing unit processes the native format data of the integrated format data according to the native image processing algorithm, and wherein when the native image processing algorithm with respect to the native format data is absent, the integrated format data processing unit processes the common format data of the integrated format data according to a common image processing algorithm.

2. The 3D image data processing apparatus of claim 1, wherein when the native image processing algorithm and the common image processing algorithm for processing the integrated format data do not exist are absent, the integrated format data processing unit returns an error.

3. The 3D image data processing apparatus of claim 1, wherein the integrated format data processing unit generates the common format data by using 2D image information and 2D depth information of the 3D image data when the 3D image data includes the 2D image information and the 2D depth information.

4. The 3D image data processing apparatus of claim 1, wherein the integrated format data processing unit converts the 3D image data to generate 2D image information or 2D depth information, and generates the common format data by using the 2D image information or the 2D depth information when the 2D image information or the 2D depth information is absent in the 3D image data.

5. The 3D image data processing apparatus of claim 1, wherein when depth information is absent in the 3D image data, the integrated format data processing unit restores depth information of the 3D image data using a depth restoration algorithm and then generates the common format data using the restored depth information.

6. The 3D image data processing apparatus of claim 1, wherein the 3D image data obtaining unit obtains the 3D image data through a sensor or by software.

7. The 3D image data processing apparatus of claim 1, wherein the 3D image data obtaining unit designates original data of the obtained 3D image data as native format data or designates, as the native format data, data obtained by adding depth information to the obtained 3D image data.

8. The 3D image data processing apparatus of claim 1, wherein when the obtained 3D image data is data other than 3D stereoscopic image data, the 3D image data obtaining unit generates image information and depth information by applying rendering.

9. A three-dimensional (3D) image data processing method comprising:
 obtaining 3D image data;
 generating common format data by using the 3D image data;
 integrating native format data of the 3D image data and the common format data to generate integrated format data; and
 processing the integrated format data according to an image processing algorithm,
 wherein the processing of the integrated format data according to the image processing algorithm comprises:
  determining whether a native image processing algorithm with respect to the native format data of the integrated format data is present or absent;
  when the native image processing algorithm is present, processing the native format data of the integrated format data according to the native image processing algorithm; and
  when the native image processing algorithm is absent, processing the common format data of the integrated format data according to a common image processing algorithm.

10. The 3D image data processing method of claim 9, wherein the processing of the integrated format data according to the image processing algorithm comprises:
 when the native image processing algorithm and the common image processing algorithm for processing the integrated format data do not exist are absent, returning an error.

11. The 3D image data processing method of claim 9, wherein, in the generating of the common format data by using the 3D image data, the common format data is generated by using 2D image information and 2D depth information of the 3D image data when the 3D image data includes the 2D image information and the 2D depth information.

12. The 3D image data processing method of claim 9, wherein, in the generating of the common format data by using the 3D image data, the 3D image data is converted to generate 2D image information or 2D depth information, and the common format data is generated by using the 2D image information or the 2D depth information when the 2D image information or the 2D depth information is absent in the 3D image data.

13. The 3D image data processing method of claim 9, wherein the generating of the common format data by using the 3D image data comprises:
 determining whether the 3D image data includes depth information or not; and
 when depth information is absent in the 3D image data, restoring depth information of the 3D image data through a depth restoration algorithm and generating the common format data.

14. The 3D image data processing method of claim 9, wherein, in the obtaining of the 3D image data, the 3D image data is obtained through a sensor or the 3D image data generated by software is obtained.

15. The 3D image data processing method of claim 9, wherein the obtaining of the 3D image data comprises:
 when the 3D image data is data other than 3D stereoscopic image data, generating image information and depth information by applying rendering.

16. The 3D image data processing method of claim 9, further comprising:
 outputting a generated stereoscopic image generated as a result of processing the integrated format data according to the image processing algorithm.

* * * * *